United States Patent Office 3,126,369
Patented Mar. 24, 1964

3,126,369
DYES WITH HALOGENPYRIDAZONE RADICALS
Hans Ruprecht Hensel, Heidelberg, Hans Baumann, Ludwigshafen (Rhine), Arnold Tartter, Lambsheim, Pfalz, and Hermann Weissauer, Ludwigshafen (Rhine), Germany, assignors to Badische Anilin- & Soda-Fabrik Aktiengesellschaft, Ludwigshafen (Rhine), Germany
No Drawing. Filed Jan. 24, 1961, Ser. No. 84,524
Claims priority, application Germany Jan. 29, 1960
6 Claims. (Cl. 260—154)

This invention relates to dyes which bear 4,5-dihalogen-pyridazone-(6) radicals in the molecule, to a process for their production and to their use for dyeing textile materials of natural, semi-synthetic and fully synthetic materials.

The term "textile materials" includes fibers, filaments, threads, flock, woven and non-woven fabrics, sheeting and films. Natural materials include, for example, natural polyamides, such as wool and silk; semi-synthetic materials include, for example, materials of regenerated cellulose, such as rayon and rayon staple. Fully synthetic materials include especially the synthetic linear polyamides, such as nylon 6, nylon 66 and nylon 11, the synthetic linear polyurethanes and the esters and ethers of cellulose, such as cellulose-2½-acetate, cellulose triacetate and ethyl cellulose.

It is an object of this invention to provide new dyes which will dye the said textile materials brilliant shades with excellent fastness properties, in particular with excellent fastness to wetting, rubbing and light.

More specifically, the invention relates to dyes of a great variety of classes which contain one or more radicals of the general formula:

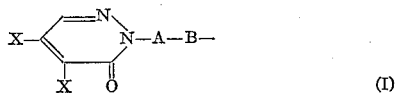

(I)

combined by way of an amino group to the remaining part of the dye molecule. In the said formula, X denotes a halogen atom, preferably a chlorine or bromine atom, A denotes a phenylene or low molecular weight alkylene radical which may be substituted by other radicals, for example by alkyl and alkoxy radicals or, in the case of a phenylene radical, also by nitro and halogen radicals, and B denotes an —$SO_2$— or —CO— group.

The new dyes according to this invention are obtained by reacting dyes containing acylatable amino groups with compounds of the general formula:

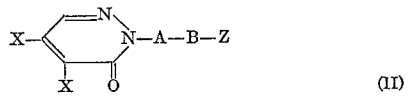

(II)

in which X, A and B have the meanings given above and Z stands for a halogen atom, preferably a chlorine atom.

The dyes to be used for the said reaction may belong to a great variety of classes. It is preferable to use dyes of the azo, anthraquinone and tetrazaporphin series.

Monoazo dyes are the most suitable azo dyes for the purposes of the said reaction, but polyazo dyes, for example disazo and trisazo dyes, may also be used as initial materials. Among the large number of anthraquinone dyes which may be used, those are the most important in which the anthraquinone system is not fused to one or more other ring systems.

The tetrazaporphin derivatives used as initial dyes may be derived from metal-free or metal-containing tetrabenzo-tetrazaporphins, for example from metal-free phthalocyanine or from iron, cobalt, nickel, copper, chromium, aluminum or zinc phthalocyanines. Other suitable initial materials are the amino-group containing derivatives of azaphthalocyanines, naphthophthalocyanines or of tetrazaporphins which contain less than four benzene rings fused to the tetrazaporphin system in the molecule, for example derivatives of tetramethyl-, tetraethyl- or tetraphenyl-dibenzotetraza nickel porphin, dimethyl-tribenzotetraza nickel porphin, tetramethyltetraphenyl- or octaphenyl-tetraza nickel porphin and of tetramethyltetraphenyl- or octaphenyl-tetraza copper porphin. The tetrazaporphin derivatives used may contain further substituents in the molecule, e.g. halogen atoms, nitro groups, alkyl groups, aryl groups and/or arylsulfonyl groups. Compounds of the said kind are derived, for example, from monochlor-, dichlor- or tetrachlor-copper phthalocyanine or from diphenyl-, tetraphenyl- or tetraphenyl-sulfonyl-copper phthalocyanine.

Tetrazaporphin derivatives which contain amino groups and also water-solubilizing groups, for example sulfonic acid groups, include tetramino-copper phthalocyanine tetrasulfonic acid, bis-, tris- and tetrakis-aminomethyl-copper phthalocyanine di-, tri- and tetrasulfonic acids. Further tetrazaporphin derivatives suitable as initial materials for the production of the new dyes are the unilateral reaction products of tetrazaporphin sulfonic acid halides and aliphatic or aromatic primary or secondary diamines or diaminosulfonic acids in which the unreacted sulfonic acid halide groups are saponified to sulfonic acid groups. Such tetrazaporphin derivatives are obtained, for example, by reacting the above-mentioned sulfonic acid halides with unilaterally acylated diamines and subsequently splitting off the acyl radical or by reacting the said sulfonic acid halides with nitroamines and subsequently reducing the nitro group to the amino group. Compounds suitable for use as initial materials for the new process are also obtained by the action of aminophenols or aminophenol sulfonic acids on halogenmethyl tetrazaporphins in sulfuric acid.

Of the said tetrazaporphin derivatives, the phthalocyanine derivatives are preferred as initial materials.

The acylatable amino groups may be primary or secondary amino groups, and the dyes used may contain one or more acylatable amino groups.

Of the dyes containing acylatable amino groups those are preferably used which contain an amino group which can be reacted with acid halides and which is attached to the dye radical either directly or by way of a bridge member, such as a divalent aliphatic or aromatic radical. Particularly suitable initial materials for the production of the new dyes are those dyes in which the amino group which can be reacted with acid halides is attached to the dye radical by way of one of the following radicals:

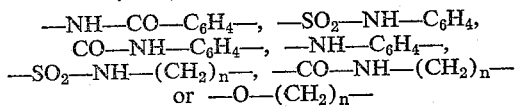

$n$ representing an integer from 2 to about 4.

If dyes containing water-solubilizing groups, for example sulfonic acid groups, sulfonic acid amide groups or carboxylic acid groups, are used as initial materials for the production of the new dyes according to this invention, water-soluble dyes are obtained. If the initial materials do not contain any substituents in the molecule which cause or increase the water solubility of these compounds, the new dyes prepared therefrom are insoluble or have little solubility in water.

The water-soluble new dyes are preferably used for dyeing wool and cellulose materials, such as cotton, rayon and rayon staple, whereas the dyes having little or no solubility in water are preferably used for dyeing synthetic textile materials, such as nylon 6, nylon 66, nylon 11 and polyethylene terephthalate. There are, however, exceptions to this rule.

Reaction of the dyes bearing amino groups with the above-specified acid halides is carried out under conditions usual for the reaction of acid halides with amines, for example in aqueous solution or slurry, in organic solvents or mixtures of water and organic solvents, advantageously in the presence of acid-binding agents, such as alkali hydroxides, alkali carbonates, alkali bicarbonates and alkali acetates, or tertiary bases, such as pyridine. In general, reaction in organic solvents or their mixtures with water is preferred.

The reaction may be conducted in homogeneous or heterogeneous phase. For example, the acid halide may be dissolved in a solvent miscible with water, for example in acetone, and the acetonic solution allowed to flow gradually into the aqueous solution of the dye. The reaction is preferably carried out at 10° to 15° C.; it is recommendable to maintain a pH value of between 6 and 7.

For acylation in heterogeneous phase, the solution of the acid halide in an organic solvent, for example in an aromatic hydrocarbon or in chloroform, as obtained in the preparation of the acid halide may be used without further working up. While stirring vigorously, the said solution is allowed to flow into the buffered aqueous solution of the dye, advantageously in the presence of a dispersing agent. The end point of the reaction may be determined by paper strip chromotograph and, in the case of aromatically bound amino groups, by testing the compounds to be acylated for diazotizability and by subsequent coupling.

Acid halides of the Formula II in which A stands for an aromatic radical are obtained, for example, from the corresponding 1-(carboxyphenyl)-4,5-dichloropyridazones-(6) or 1-(sulfophenyl)-4,5-dichloropyridazones-(6) by reaction with halogenating agents, such as phosphorus oxychloride, phosphorus pentachloride or thionyl chloride. The 1-(sulfophenyl)-4,5-dihalogenpyridazones-(6) can be obtained, for example, by reacting a suitable aryl hydrazine with a mucohalic acid, for example with mucochloric or mucobromic acid, in aqueous mineral acid solution at room temperature and treating the reaction product with concentrated sulfuric acid or by heating a mucohalic acid with a suitable aryl hydrazine in aqueous mineral acid solution.

The corresponding sulfonic acid chlorides (B=—SO$_2$— in Formula II) may also be prepared, for example, by sulfochlorination of 1-phenyl-4,5-dichloropyridazone-(6).

Acid halides of the Formula II in which A stands for an aliphatic radical are obtained, for example, by adding hydrazine on to an $\alpha,\beta$-unsaturated nitrile and reacting the resultant substituted hydrazine with a mucohalic acid. The 4,5-dihalogenpyridazones-((6) thus obtained, which have an alkylnitrile group in the 1-position, are then converted by saponification into the corresponding carboxylic acids and by subsequent halogenation into the carboxylic acid halides.

The new dyes are especially suitable for dyeing and printing the above-mentioned kinds of textile material as well as leather. It is expedient to coemploy basic-reacting substances when dyeing and printing with the new dyes. Such substances are, for example, alkali metal hydroxides, such as sodium hydroxide and potassium hydroxide, alkali metal carbonates, such as sodium carbonate and potassium carbonate, alkali metal bicarbonates, such as sodium bicarbonate, and alkali metal acetates, such as sodium acetate, potassium acetate and sodium chloracetate.

When dyeing with the new dyes, the procedure may be, for example, that materials of cellulose are padded with an aqueous solution of the dye and, advantageously after drying, passed through an aqueous bath containing a basic-reacting substance, such as sodium hydroxide, sodium carbonate, sodium bicarbonate, sodium trichloracetate, potassium hydroxide or potassium carbonate, and the dye is then fixed on the fiber by steaming for a short time. Instead of steaming, the material may be treated with air of between 70° and 200° C., preferably between 100° and 150° C., or the moist material padded with the coemployment of alkali hydroxides is allowed to stand for several hours at room temperature. The basic-reacting substance may, however, also be added to the padding bath. It is also possible to conduct dyeing with the new dyes, with the addition of basic-reacting substances and, advantageously, of neutral salts such as sodium chloride or sodium sulfate, at temperatures between 30° and 50° C. and to fix the dyes on the material by gradually raising the bath temperature. A further procedure consists in pretreating the cellulosic material with aqueous solutions of basic-reacting substances, drying the material, then dyeing it with the new dyes and fixing the dyes thereon.

In printing textile materials of cellulose, the dyes are advantageously brought onto the fiber together with a basic-reacting substance and thickening agents, such as sodium alginate or tragacanth, advantageously with the coemployment of a conventional printing auxiliary. The material is then dried at temperatures between 70° and 200° C., preferably between 100° and 150° C., or steamed for a short time. The materials may also be printed with the new dyes and a conventional printing auxiliary, dried, passed through an aqueous bath containing a basic-reacting substance, and then treated with air at temperatures between 70° and 200° C. or steamed at 105° C. It is also possible to pretreat the material with basic-reacting substances, print it with the new dyes together with thickening agents and, if desired, printing auxiliaries, and then dry or steam the material.

The invention is further illustrated, but not limited, by the following examples. The parts and percentages are by weight. Parts by volume have the same relation to parts by weight as the liter to the kilogram under normal conditions.

*Example 1*

10% aqueous acetic acid is allowed to flow into a solution of 19 parts of the azo dye 1-aminobenzene-2-sulfonic acid → 1-(4-aminophenyl)-3-methylpyrazolone-(5), 4 parts of sodium hydroxide and 4 parts of a commercial dispersing agent in 400 parts of water until the solution has a pH value of 6 to 7. A solution of 20 parts of 1-(4-chlorosulfophenyl)-4,5-dichloropyridazone-(6) in 200 parts of acetone is allowed to flow in slowly at 10° to 15° C., while stirring. The hydrogen chloride formed in the reaction is neutralized by adding sufficient 10% aqueous sodium bicarbonate solution to maintain a pH value of 6 to 7 in the suspension. The mixture is stirred until the reaction is completed, further 1-(4-chlorosulfophenyl)-4,5-dichloropyridazone-(6) being added if required. The reaction is complete when a sample of the reaction product can no longer be diazotized. The reaction product is filtered off, washed with water until it has a neutral reaction, and dried at 70° C. 38 parts of a dye of the formula:

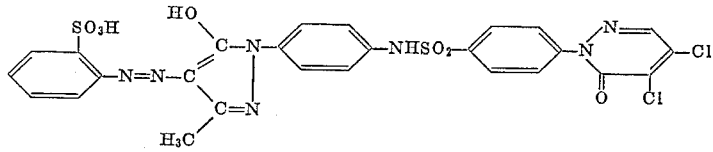

are obtained.

A cotton fabric is padded with an aqueous solution which contains, in 1 liter, 15 parts of the said dye, 10 parts of sodium sulfate and 25 parts of sodium carbonate.

The fabric is squeezed out, dried, steamed for five minutes at 105° C. and soaped at the boil. A yellow dyeing of excellent wet and light fastness is obtained.

A dye with similar properties can be prepared by using the equivalent amount of 1-(4-chlorosulfophenyl)-4,5-dibromopyridazone-(6) instead of 1-(4-chlorosulfophenyl)-4,5-dichloropyridazone-(6).

1-(4-chlorosulfophenyl)-4,5-dichloropyridazone-(6) is obtained, for example, by introducing 82 parts of 1-phenyl-4,5-dichloropyridazone-(6) into 150 parts of chlorosulfonic acid and heating the mixture for four to five hours at 100° to 120° C. The compound is colorless and has a melting point of 144° C.; the yield is 104 parts.

1-phenyl-4,5-dichloropyridazone-(6) is prepared as follows:

A solution of 11 parts of phenylhydrazine in 200 parts of water and 30 parts of hydrochloric acid is added to a solution of 17 parts of mucochloric acid in 100 parts of water. The mixture is stirred for one hour at room temperature and then heated, while stirring, for three hours at 90° to 100° C. The deposited reaction product is filtered off and dried. 19 parts of 1-phenyl-4,5-dichloropyridazone-(6) of the melting point 161° C. are obtained.

If the equivalent amount of mucobromic acid is used instead of mucochloric acid and the resultant 1-phenyl-4,5-dibromopyridazone-(6) is reacted with chlorosulfonic acid in the manner described above, 1-(4-chlorosulfophenyl)-4,5-dibromopyridazone-(6) is obtained.

*Example 2*

A solution of 25 parts of 1-(4-chlorosulfophenyl-4,5-dichloropyridazone-(6) in 200 parts of acetone is allowed to flow, at 10° C., into a solution of 27 parts of the azo dye 1-aminobenzene-2-sulfonic acid → 1-hydroxy-6-(4-aminobenzoylamino)-naphthalene-3-sulfonic acid in 250 parts of pyridine. The mixture is stirred for three hours at 10° C. and for another ten hours at room temperature. The reaction product is precipitated by adding water. 35 parts of an orange-red dye of the formula:

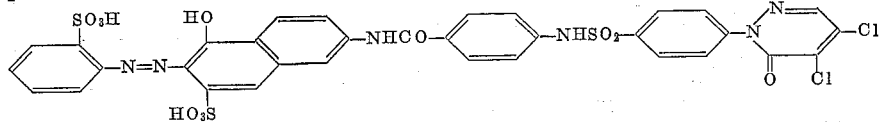

are obtained, which dyes wool and cotton orange-red shades of excellent fastness.

*Example 3*

69 parts of 1-aminobenzene-4-carboxylic acid are diazotized in the usual manner and reduced with 230 parts of tin(II) chloride. 85 parts of mucochloric acid are added to the mixture, the whole is stirred for twenty hours at room temperature and the reaction product filtered off. After drying, the reaction product is introduced into 500 parts of concentrated sulfuric acid, while stirring. Stirring is continued for another twelve to fifteen hours. The mixture is then poured into ice water. 136 parts of 1-(4-carboxyphenyl)-4,5-dichloropyridazone-(6) being obtained as a pale yellow powder with a melting point of 314° to 316° C.

A mixture of 57 parts of 1-(4-carboxyphenyl)-4,5-dichloropyridazone-(6), 200 parts by volume of nitrobenzene, 70 parts of thionyl chloride and 2 parts of pyridine is heated for three hours at 95° C. After cooling the mixture to room temperature, the reaction product is filtered off and washed with a little ether. The reaction product is dried under reduced pressure, and 48 parts of the corresponding acid chloride 1-(4-chlorocarbonylphenyl)-4,5-dichloropyridazone-(6) are obtained. It has a melting point of 153° to 155° C.

A solution of 45.5 parts of the said acid chloride in about 400 parts by volume of tetrahydrofurane is allowed to flow, in the course of one hour, into a solution of 48.9 parts of 1-amino-4-(3-amino-4-sulfophenylamino)-anthraquinone-2-sulfonic acid in 1,000 parts of water, the pH value of the mixture being maintained at 4 to 5 by simultaneous addition of 10% aqueous sodium carbonate solution. While maintaining the said pH value, the mixture is stirred for another four to five hours. The pH value is then raised to about 7 by adding sodium carbonate, and the dye formed which has the formula:

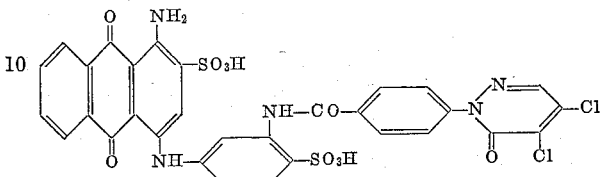

is precipitated in the form of its salt by adding a little potassium chloride. The dye is filtered off and washed with dilute aqueous potassium chloride solution. It dissolves in water giving a blue color and, in the presence of basic-reacting substances, dyes cotton fast blue shades.

Dyes with similar properties are obtained by using 1-amino-4-(3-sulfo-4-aminophenylamino)-anthraquinone-2-sulfonic acid, 1-amino-4-(3-sulfo-4-aminophenylamino)-anthraquinone-2,5- or -2,6-disulfonic acid, 1-amino-4-(3-amino-4-sulfophenylamino)-anthraquinone-2,5- or -2,6-disulfonic acid or 1,4-diaminoanthraquinone-2,5- or -2,6-disulfonic acid instead of 1-amino-4-(3-amino-4-sulfophenylamino)-anthraquinone-2-sulfonic acid.

Further similar dyes are obtained by using, instead of 1-(4-chlorocarbonylphenyl)-4,5-dichloropyridazone-(6), the same amount of 1-(3-chlorocarbonylphenyl)-4,5-dichloropyridazone-(6) or the equivalent amount of 1-(4-chlorocarbonylphenyl)-4,5-dibromopyridazone-(6).

1-(3-chlorocarbonylphenyl)-4,5-dichloropyridazone-(6) is prepared in the same manner as 1-(4-chlorocarbonylphenyl)-4,5-dichloropyridazone-(6) except that, instead of 1-aminobenzene-4-carboxylic acid, the same amount of 1-aminobenzene-3-carboxylic acid is used as initial material.

1-(4-chlorocarbonylphenyl)-4,5-dibromopyridazone-(6) is also prepared in the same manner as 1-(4-chlorocarbonylphenyl)-4,5-dichloropyridazone-(6), the equivalent amount of mucobromic acid being used instead of mucochloric acid.

*Example 4*

A solution of 37.4 parts of 1-(4-chlorosulfophenyl)-4,5-dichloropyridazone-(6) in 100 parts of acetone is allowed to flow, in the course of half an hour, into a neutralized solution of 53.3 parts of 1-amino-4-(3-sulfo-4-aminophenylamino)-anthraquinone-2-sulfonic acid in 1,500 parts of water. The mixture is stirred for eight hours at a pH value of 4 to 5, for ten hours at a pH value of 6, and for another two hours while heating it to 40° C. Then the mixture is filtered. From the filtrate, a dye of the formula:

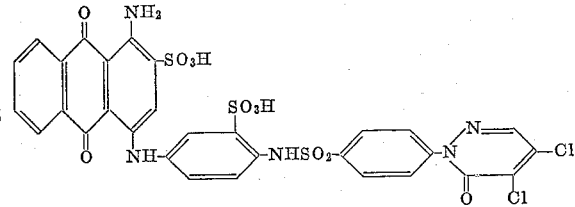

is precipitated in the form of its salt by adding sodium chloride. The dye is filtered off and dried under reduced pressure. In the presence of basic-reacting substances, it dyes cotton blue shades of excellent fastness.

Dyes with similar properties are obtained by using 1-amino-4-(3-sulfo-4-aminophenylamino)-anthraquinone- 2-sufonic acid, 1-amino-4-(3-sulfo-4-aminophenylamino)-anthraquinone-2,5- or -2,6-disulfonic acid, 1-amino-4-(3-amino-4-sulfophenylamino)-anthraquinone-2,5- or -2,6-disulfonic acid or 1,4-diaminoanthraquinone-2,5- or -2,6-disulfonic acid instead of 1-amino-4-(3-amino-4-sulfophenylamino)-anthraquinone-2-sulfonic acid. Instead of 1-(4-chlorosulfophenyl) - 4,5 - dichloropyridazone-(6), 1-(4-chlorosulfophenyl)-4,5-dibromopyridazone-(6) can be used with equally good results.

*Example 5*

A solution of 25 parts of 1-(4-chlorosulfophenyl)-4,5-dichloropyridazone-(6) in 140 parts of acetone is stirred, at about 5° C., into a neutralized solution of 30 parts of a compound of the formula:

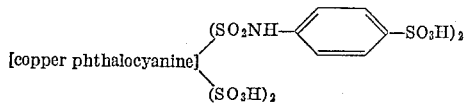

in 300 parts of water. A solution of 16 parts of crystallized sodium acetate in 30 parts of water is gradually added to the mixture, and the whole is stirred for about thirty hours at room temperature. Then 400 parts of a saturated aqueous sodium chloride solution and such an amount of solid potassium chloride are added that the dye formed is separated completely. The dye is filtered off, washed with ethanol and acetone, and dried in the air. It dissolves in water giving a turquoise-blue color and, in the presence of basic-reacting substances, dyes cotton turquoise-blue shades of excellent wet fastness.

If the corresponding derivatives of nickel or iron phthalocyanine be used instead of the above-mentioned copper phthalocyanine derivative, green-blue dyes with similar properties are obtained, whereas a green dye is formed when the corresponding tetraphenyl-copper phthalocyanine derivative is used. Blue dyes can be prepared in the same manner by using bisaminomethyl-copper phthalocyanine tetrasulfonic acid or bisaminomethyldiaza-copper phthalocyanine disulfonic acid as initial material.

*Example 6*

A solution of 25 parts of 1-(4-chlorocarbonylphenyl)-4,5-dichloropyridazone-(6) in 150 parts of dioxane is added, at about 0° C. and while stirring, to a neutralized solution of 29 parts of a compound of the formula:

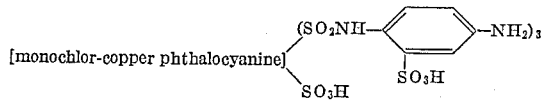

in 300 parts of water. A solution of 10 parts of crystallized sodium acetate in 20 parts of water is allowed to flow into this mixture, and the whole is stirred for ten hours at room temperature. Then 300 parts of a saturated sodium chloride solution and such an amount of solid potassium chloride are added that the reaction product is precipitated completely. The dye formed is filtered off, washed with aqueous potassium chloride solution and dried at a low temperature. In the presence of basic-reacting substances, it dyes cotton fast turquoise-blue shades.

Dyes with similar properties are obtained by using, instead of 1-(4-chlorocarbonylphenyl)-4,5-dichloropyridazone-(6), the same amount of 1-(3-chlorocarbonylphenyl)-4,5-dichloropyridazone-(6) or the equivalent amounts of 1-(4-chlorocarbonylphenyl)-4,5-dibromopyridazone-(6) or 1-(4-chlorosulfophenyl)-4,5-dichloropyridazone-(6) or 1-(4-chlorosulfophenyl)-4,5-dibromopyridazone-(6).

*Example 7*

A mixture of 47.4 parts of β-(4,5-dichloropyridazonyl-1)-propionic acid of the formula:

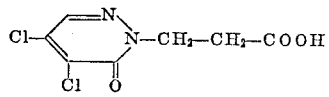

142 parts by volume of benzene and 71.4 parts of thionyl chloride is heated for three hours at the boil. Then the solvent and the excess thionyl chloride are distilled off on a water bath under reduced pressure, and the syrupy residue is dissolved in 70 parts by volume of acetone. This solution is allowed to flow, in the course of two hours, into a mixture of 53.3 parts of the disodium salt of 1-amino-4-(3 - sulfo-4-aminophenylamino)-anthraquinone-2-sulfonic acid, 1,000 parts of water and 300 parts of ice, the pH value of the mixture being maintained at 6.5 to 6.7 by adding 233 parts by volume of a 10% aqueous sodium carbonate solution. The mixture is stirred for another half hour. Then a dye of the formula:

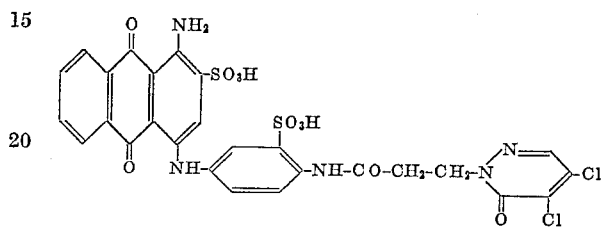

is separated in the form of its sodium salt by adding 283 parts of sodium chloride. The dye is filtered off and dried under reduced pressure. The new dye readily dissolves in water giving a blue color and, in the presence of basic-reacting substances, dyes cotton greenish-blue shades fast to wet treatment and light.

Dyes with similar properties are obtained by using 1-amino-4-(3-amino-4-sulfophenylamino)-anthraquinone-2-sulfonic acid, 1-amino-4-(3-sulfo-4-aminophenylamino)-anthraquinone-2,5- or -2,6-disulfonic acid, 1-amino-4-(3-amino-4-sulfophenylamino)-anthraquinone-2,5- or -2,6-disulfonic acid or 1,4-diaminoanthraquinone-2,5- or -2,6-disulfonic acid instead of 1-amino-4-(3-sulfo-4-aminophenylamino)-anthraquinone-2-sulfonic acid, or by using the equivalent amount of β-(4,5-dibromopyridazonyl-1)-propionyl chloride instead of β-(4,5-dichloropyridazonyl-1)-propionyl chloride.

β-(4,5-dichloropyridazonyl-1)-propionic acid is prepared as follows:

85 parts of 2-hydrazinopropionitrile (obtained by reaction of hydrazine hydrate with acrylonitrile) are allowed to flow into 500 parts of 8% hydrochloric acid, while stirring. 170 parts of mucochloric acid are added to this mixture, and the whole is heated for one hour at 90° C. After cooling, 210 parts of 1-(2-cyanoethyl)-4,5-dichloropyridazone-(6) are obtained as a colorless compound of the melting point 85° C.

β-(4,5-dichloropyridazonyl-1)-propionic acid of the melting point 127° C. is obtained by saponification of the said compound.

By reacting 2-hydrazinopropionitrile with the equivalent amount of mucobromic acid instead of with mucochloric acid and otherwise following the procedure described above, β-(4,5-dibromopyridazonyl-1)-propionic acid is obtained, from which β-(4,5-dibromopyridazonyl-1)-propionyl chloride is prepared by reaction with thionyl chloride.

*Example 8*

30 parts of a dye obtained by coupling 1-amino-3-acetaminobenzene - 6 - sulfonic acid with 1-hydroxynaphthalene-4-sulfonic acid and subsequent saponification of the acetamino group are dissolved in 400 parts of water, and a pH value of 6 is set up by adding acetic acid and sodium acetate. An acetone solution of 30 parts of β-(4,5-dichloropyridazonyl-1)-propionyl chloride prepared according to Example 7 is allowed to flow into the said solution in the course of 40 minutes at room temperature. A pH value of 6 is maintained by adding 10% aqueous sodium bicarbonate solution and, if required, further amounts of acid chloride are added until the diazo reaction of the initial dye is negative. By salting out, 52 parts of a dye of the formula:

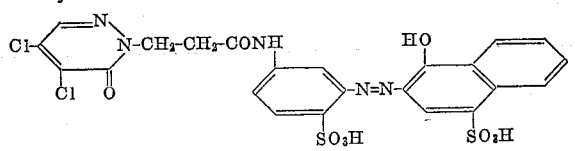

are obtained which, in the presence of acid-binding agents, dyes cotton red shades.

A dye with similar properties is obtained by using the equivalent amount of β-(4,5-dibromopyridazonyl-1)-propionyl chloride instead of β-(4,5-dichloropyridazonyl-1)-propionyl chloride.

Example 9

An acetone solution of 20 parts of β-(4,5-dichloropyridazonyl-1)-propionyl chloride prepared according to Example 7 is allowed to flow, in the course of 40 minutes and at 20° C., into a solution of 30 parts of a dye of the formula:

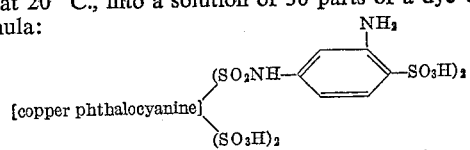

in 400 parts of water which has been adjusted to pH 6. The pH value is maintained at 6 to 7 by adding 10% sodium bicarbonate solution. After the reaction has ended, 42 parts of a dye are obtained by salting out. In the presence of acid-binding agents it dyes cotton turquoise-blue shades.

A dye with similar properties is obtained by using the equivalent amount of β-(4,5-dibromopyridazonyl-1)-propionyl chloride instead of β-(4,5-dichloropyridazonyl-1)-propionyl chloride.

Example 10

A benzene solution of 20 parts of β-(4,5-dichloropyridazonyl-1)-propionyl chloride prepared according to Example 7 is allowed to drip, in the course of one hour, at room temperature and while stirring vigorously, into an aqueous solution (which has been adjusted to a pH value of 6 to 7) of 22 parts of a dye obtained by coupling diazotized o-aminobenzene sulfonic acid with 1-hydroxy-8-acetaminonaphthalene - 3,6 - disulfonic acid and saponification in 5% caustic soda solution. Acylation is completed after 3 or 4 hours. After separation of the benzene layer, 45 parts of a bluish-red dye of the formula:

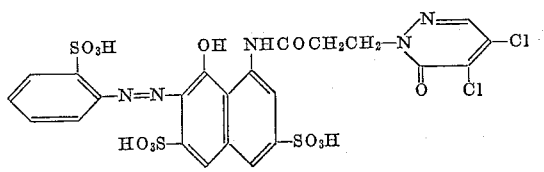

are obtained from the aqueous phase by salting out. In the presence of acid-binding agents, it dyes cotton red shades of excellent light and wet fastness.

Dyes of the following formulae, in which R stands for the β-(dichloropyridazonyl)-propionyl radical, are obtained in an analogous manner:

| Ex. | Formula of dye | Shade of dyeing on cotton |
|---|---|---|
| 11 | ![structure] | greenish-yellow. |
| 12 | ![structure] | reddish-yellow. |
| 13 | ![structure] | orange. |
| 14 | ![structure] | Do. |
| 15 | ![structure] | orange red. |
| 16 | ![structure] | red. |

| Ex. | Formula of dye | Shade of dyeing on cotton |
|---|---|---|
| 17 | R—NH—⟨phenyl-SO₃H⟩—N=N—⟨naphthyl(HO)(SO₃H)⟩ | red. |
| 18 | R—NH—⟨phenyl⟩—N=N—⟨naphthyl(HO)(SO₃H)(HO₃S)⟩ | Do. |
| 19 | HO₃S—⟨phenyl(SO₃H)⟩—N=N—⟨naphthyl(OH)(NH—R)(HO₃S)(SO₃H)⟩ | bluish-red. |
| 20 | R—NH—⟨phenyl(SO₃H)⟩—N=N—⟨naphthyl(OH)(NH—R)(HO₃S)(SO₃H)⟩ | red-violet. |
| 21 | HO₃S—⟨naphthyl(SO₃H)⟩—N=N—⟨phenyl(CH₃)⟩—NH—R | yellow. |
| 22 | HO₃S—⟨phenyl(Cl)⟩(O—Cu—O)—N=N—⟨naphthyl(HO₃S)⟩—NH—R | red-violet. |
| 23 | 1:2-chromium complex of: HO₃S—⟨naphthyl(OH)(R—NH)⟩—N=N—⟨naphthyl(HO)⟩ | grey. |
| 24 | 1:2-cobalt complex of: HO₃S—⟨phenyl(OH)⟩—N=N—⟨naphthyl(HO)(HO₃S)⟩—NH—CO—NH—⟨naphthyl(OH)(SO₃H)⟩—N=N—⟨phenyl(HO)(SO₃H)⟩—NH—R ; R—HN | claret. |
| 25 | HO₃S—⟨phenyl⟩—N=N—⟨phenyl(SO₃H)⟩—N=N—⟨phenyl(CH₃)(H₃C)⟩—N(CH₃)—R | yellow. |
| 26 | HO₃S—⟨naphthyl(OH)(HO₃S)(SO₃H)⟩—N=N—⟨phenyl(HO₃S)⟩—N=N—⟨phenyl(H₃C)⟩—NH—R | Do. |

The dye specified in Example 22 is prepared by coupling diazotized 4-chlor-2-aminophenyl-6-sulfonic acid with β-(4,5-dichloropyridazone-(6)-yl)-propionylamino-5-hydroxynaphthalene-7-sulfonic acid and heating the resultant product in aqueous solution with the equivalent amount of copper(II) acetate for 30 minutes at 40° C.

The dye specified in Example 23 is obtained by reducing the 1:2-chromium complex of the azo dye 6-nitro- 1-amino-2-hydroxynaphthalene-4-sulfononic acid→2-hydroxynaphthalene in aqueous solution with sodium sulfide to the corresponding amino compound and reacting the resultant compound with β-(4,5-dichloropyridazonyl)-propionyl chloride.

The dye specified in Example 24 is obtained by reducing the reaction product of 6-nitro-2-aminophenol-4-sulfonic acid and β-(4,5-dichloropyridazonyl)-propionyl chloride with iron in acetic acid solution to the corresponding amine, diazotizing the latter, and coupling 2 mols of this diazo compound with 1 mol of bis-(5-hydroxy-7-sulfonaphthyl-2)-urea. This resultant product is reacted in aqueous solution at 60° C. with an equimolar amount of cobalt (II) chloride.

Similar dyes are obtained by using, instead of β-(4,5-dichloropyridazonyl-1)-propionyl chloride, the equivalent amounts of β-(4,5-dibromopyridazonyl)-propionyl chloride, 1-(4-chlorocarbonylphenyl)-4,5-dichloropyridazone-(6), 1-(3-chlorocarbonylphenyl)-4,5-dichloropyridazone-(6), 1-(4-chlorocarbonylphenyl)-4,5-dibromopyridazone-(6), 1-(4-chlorosulfophenyl)-4,5-dichloropyridazone-(6) or 1-(4-chlorosulfophenyl)-4,5-dibromopyridazone(6).

*Example 27*

48 parts of a mixture of copper phthalocyanine sulfonic acid - (β - aminoethylamide) - trisulfonic acid and copper phthalocyanine disulfonic acid - (β - aminoethylamide)-disulfonic acid (obtained by reaction of 1 mol of copper phthalocyanine-3,3′,3″,3‴-tetrasulfonic acid chloride with 1.5 mols of monoacetylethylene diamine and alkaline saponification of the unreacted sulfonic acid chloride groups and of the acetyl groups) are dissolved in 500 parts of water at a pH of about 7 and gradually mixed, at 0° to 10° C. and while stirring vigorously, with a solution of 35 parts of β-(4,5-dichloropyridazonyl-1)-propionyl chloride in 35 parts of chloroform. A pH value of about 5 is maintained by adding 10% aqueous sodium carbonate solution. The mixture is allowed to stand for about ten hours at room temperature. Then a pH value of 3.5 to 4 is set up by adding dilute hydrochloric acid, 100 parts of potassium chloride are added, and the deposited reaction product is filtered off and dried under reduced pressure at about 50° C. In the presence of basic-reacting substances, the dye obtained dyes cotton fast turquoise-blue shades.

Similar turquoise-blue dyes are obtained by using, instead of the above copper phthalocyanine derivative, compounds which have been prepared by reaction of 1 mol of copper phthalocyanine-3,3′,4″,4‴- or 3,4′,4″,4‴- or 4,4′,4″,4‴-tetrasulfonic acid chloride or copper phthalocyanine-3,3′,3″-trisulfonic acid chloride with 1 to 2 mols of monoacetylethylene diamine and subsequent alkaline saponification. If nickel, iron or aluminum phthalocyanine-3,3′,3″-trisulfonic acid chloride or -3,3′,3″,3‴-tetrasulfonic acid chloride is used as the starting material and (4,5-dichloropyridazonyl-1)-propionyl chloride is allowed to act on the saponified reaction products, greenish-blue to green-blue dyes are obtained.

*Example 28*

20 parts of a mixture of tetrakis- and pentakis-chloromethylcopper phthalocyanine and 30 parts of 1-hydroxy-2-aminobenzene-4-sulfonic acid are heated in 300 parts of 100% sulfuric acid for about ten hours at 100° to 110° C. After cooling, the solution is poured onto ice and the reaction product filtered off. The moist filtrate is made into a paste with 300 parts of ice, neutralized with dilute caustic soda solution and gradually mixed, while stirring rapidly, with a solution of 30 parts of (4,5-dichloropyridazonyl-1)-propionyl chloride in 100 parts of toluene. A pH value of about 6 is maintained for ten hours by adding dilute aqueous potassium carbonate solution. The mixture is then acidified and the dye salted out completely. It dyes cotton fast green-blue shades.

*Example 29*

30 parts of a compound of the formula:

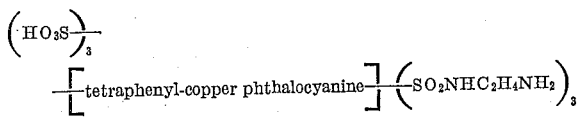

are stirred with 400 parts of water by means of an impeller and gradually mixed with a solution of 25 parts of (4,5-dichloropyridazonyl-1)-propionyl chloride in 50 parts of acetone, a pH value of about 5 to 5.5 being maintained by adding dilute aqueous sodium acetate solution and dilute aqueous sodium carbonate solution. After about 8 hours, the solution is made strongly acid and the deposited reaction product filtered off. After drying, 45 parts of a dye are obtained which, in the presence of acid-binding agents, dyes cotton brilliant fast green shades.

Other dyes are obtained by using, instead of the compound first specified in the present example, appropriate amounts of compounds of the following formulae:

| Ex. | Formula of compound | Shade produced with the final dye on cotton |
|---|---|---|
| 30 | $\left(HO_3S\right)_4$-[-tetraphenyl-copper phthalocyanine-]-$\left(SO_2NH-\langle\rangle-NH_2\right)_2$ | green. |
| 31 | $\left(HO_3S\right)_3$-[-tetraphenyl-copper phthalocyanine-]-$\left(SO_2NH-\langle\rangle-NH_2\right)_3$ | Do. |
| 32 | $\left(HO_3S\right)_3$-[-tetraphenyl-copper phthalocyanine-]-$\left(SO_2NH-\langle\rangle(SO_3H)-NH_2\right)_3$ | Do. |
| 33 | $\left(HO_3S\right)_2$-[-tetraphenyl-copper phthalocyanine-]-$\left(SO_2NHC_2H_4NH_2\right)_2$ | Do. |
| 34 | $\left(HO_3S\right)_2$-[-diphenyl-copper phthalocyanine-]-$\left(SO_2NHC_2H_4NH_2\right)_2$ | blue-green. |
| 35 | $\left(HO_3S\right)_2$-[-tetraphenylmercapto-copper phthalocyanine-]-$\left(SO_2NHC_2H_4NH_2\right)_2$ | gray-green. |
| 36 | $\left(HO_3S\right)_2$-[-copper phthalocyanine-]-$\left(S-\langle\rangle-NH_2\right)_2$ | green-blue. |

| Ex. | Formula of compound | Shade produced with the final dye on cotton |
|---|---|---|
| 37 | $(HO_3S)_3$[copper phthalocyanine]$(CO$—⟨⟩—$NH_2)_2$ | greenish-blue. |
| 38 | $(HO_3S)_3$[copper phthalocyanine]$(SO_2$—⟨⟩—$NH_2)_2$ | turquoise. |
| 39 | $(HO_3S)_3$[monochlor-copper phthalocyanine]$(SO_2NHC_2H_4NH_2)$ | Do. |
| 40 | $(HO_3S)_3$[copper phthalocyanine]$(NH_2)_4$ | Do. |
| 41 | $(HO_3S)_3$[copper phthalocyanine]$(CH_2NH_2)_2$ | Do. |

Example 42

25 parts of a compound of the formula:

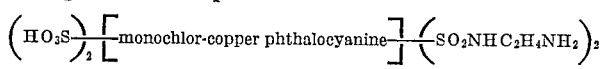
$(HO_3S)_2$[monochlor-copper phthalocyanine]$(SO_2NHC_2H_4NH_2)_2$ are dissolved in 400 parts of a 1% aqueous caustic soda solution and mixed, in the course of an hour and with rapid stirring, with a solution of 25 parts of 1-(4-chlorocarbonylphenyl)-4,5-dichloropyridazone-(6) in 120 parts of acetone. A pH value of about 5 is maintained for several hours by adding aqueous sodium acetate solution. The mixture is then stirred for another eight to ten hours at a pH value of 6 to 6.5, and salted out. The reaction product is filtered off and dried under reduced pressure at 50° to 60° C. 45 parts of a dye are obtained which dyes rayon staple blue shades fast to wet treatment and light.

Green dyes are obtained in an analogous manner by using, instead of the monochlor-copper phthalocyanine derivative first specified in the present example, equivalent amounts of compounds of the following formulae:

in which E denotes a group selected from the group consisting of phenyl, monosulfophenyl, disulfophenyl, methoxyphenyl, disulfonaphthyl, the radical of the formula

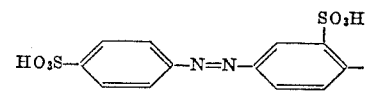

and the radical of the formula

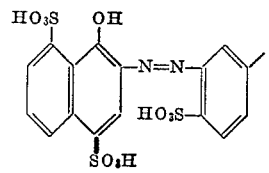

| Ex. | Formula of Compound |
|---|---|
| 43 | $(HO_3S)_3$[tetraphenyl-copper phthalocyanine]$(SO_2NH_2C_2H_4NH_2)_3$ |
| 44 | $(HO_3S)_3$[tetraphenyl-nickel phthalocyanine]$(SO_2NHC_2H_4NH_2)_3$ |
| 45 | $(HO_3S)_3$[tetraphenyl-copper phthalocyanine]$(SO_2NH$—⟨N=N, NH_2, SO_3H⟩$)_3$ |
| 46 | $(HO_3S)_3$[tetraphenyl-copper phthalocyanine]$(SO_2NH$—⟨⟩—$NH_2)_3$ |
| 47 | $(HO_3S)_2$[tetraphenyl-copper phthalocyanine]$(SO_2NH$—⟨SO_3H⟩—$NH_2)_2$ |
| 48 | $(HO_3S)_3$[tetraphenyl-copper phthalocyanine]$(SO_2NHC_2H_4NH_2)$ |

We claimed:
1. An azo dye of the general formula

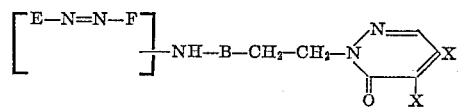

F denotes a group selected from the group consisting of methylphenyl, 1-phenyl-3-methylpyrazolon-(5)-yl-(4), 1-sulfophenyl)-3-methylpyrazolon(5)-yl-(4), 1-(chloro-sulfophenyl) - 3 - methylpyrazolon(5)-yl(4), hydroxymonosulfonaphthyl, hydroxydisulfonaphthyl; B denotes a divalent group selected from the group consisting of —CO— and —SO$_2$—; X denotes a member selected from the group consisting of a bromine atom and a chlorine atom; and in which the grouping

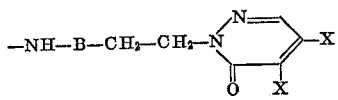

is attached to an aromatic nucleus of the moiety

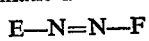

and wherein the dye molecule contains at least one sulfonic acid group.

2. The dye of the formula:

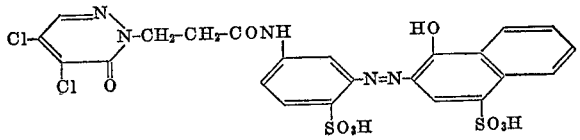

3. The dye of the formula:

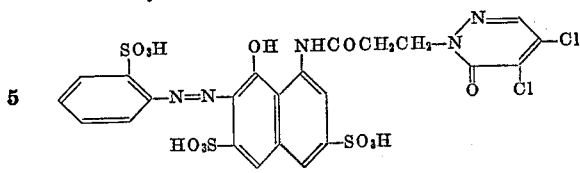

4. The dye of the formula:

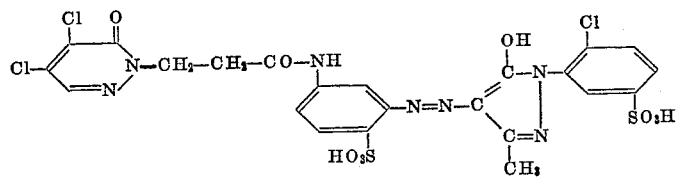

5. The dye of the formula:

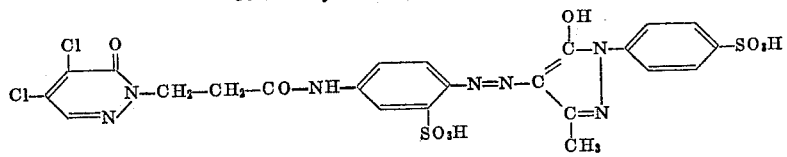

6. The dye of the formula:

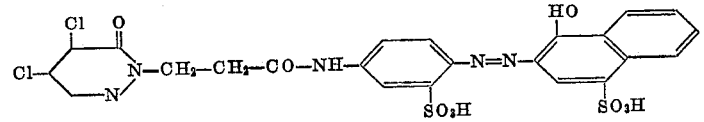

References Cited in the file of this patent

UNITED STATES PATENTS

| | | |
|---|---|---|
| 2,426,313 | Ludwig et al. | Aug. 26, 1947 |
| 2,816,892 | Young et al. | Dec. 17, 1957 |
| 2,831,850 | Merian et al. | Apr. 22, 1958 |
| 2,917,507 | Druey | Dec. 15, 1959 |

UNITED STATES PATENT OFFICE
CERTIFICATE OF CORRECTION

Patent No. 3,126,369                          March 24, 1964

Hans Ruprecht Hensel et al.

It is hereby certified that error appears in the above numbered patent requiring correction and that the said Letters Patent should read as corrected below.

Column 3, line 53, for "((6)" read -- -(6) --; column 5, line 32, for "1-(4-chlorosulfophenyl-4,5-" read -- 1-(4-chlorosulfophenyl)-4,5- --; columns 11 and 12, Example 21, for that portion of the formula reading

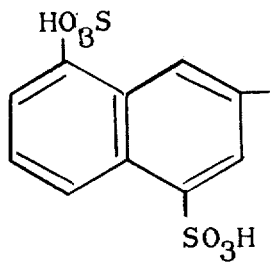  read  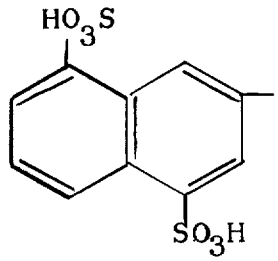

columns 15 and 16, Examples 43 and 44, for that portion of the formulas, each occurrence, reading

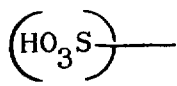  read  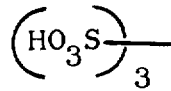

same columns, Example 45, strike out "N"; column 18, claim 6, for that portion of the formula reading

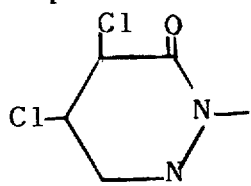  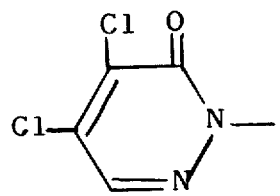

same column 18, line 40, for "2,917,507" read -- 2,917,509 --.

Signed and sealed this 15th day of September 1964.

(SEAL)
Attest:

ERNEST W. SWIDER                          EDWARD J. BRENNER
Attesting Officer                         Commissioner of Patents